US009697817B2

(12) United States Patent
Zalewski et al.

(10) Patent No.: US 9,697,817 B2
(45) Date of Patent: Jul. 4, 2017

(54) TUNABLE ACOUSTIC ATTENUATION (71) Applicant: ZIN TECHNOLOGIES, INC., Middleburg Heights, OH (US)

(72) Inventors: Bart F. Zalewski, Lakewood, OH (US); William Dial, Cuyahoga Falls, OH (US); Arthur J. Birchenough, Berea, OH (US)

(73) Assignee: ZIN Technologies, Inc., Middleburg Heights, OH (US)

( * ) Notice: Subject to any disclaimer, the term of this patent is extended or adjusted under 35 U.S.C. 154(b) by 0 days.

(21) Appl. No.: 15/154,155

(22) Filed: May 13, 2016

(65) Prior Publication Data
US 2016/0335999 A1 Nov. 17, 2016

Related U.S. Application Data (60) Provisional application No. 62/161,470, filed on May 14, 2015.

(51) Int. Cl.
*G10K 11/172* (2006.01)
*B22D 11/01* (2006.01)
*B33Y 10/00* (2015.01)
*B33Y 80/00* (2015.01)
B29C 67/00 (2017.01)
E04B 1/84 (2006.01)

(52) U.S. Cl.
CPC ............ *G10K 11/172* (2013.01); *B22D 11/01* (2013.01); *B33Y 10/00* (2014.12); *B33Y 80/00* (2014.12); *B29C 67/0055* (2013.01); *E04B 2001/8433* (2013.01)

(58) Field of Classification Search
CPC .......... G10K 11/172; E04B 2001/8433; E04B 2001/848; E04B 2001/8485; E04B 2001/849; E04B 2001/8495
USPC ........ 181/286, 287, 288, 290, 292, 293, 295
See application file for complete search history.

(56) References Cited

U.S. PATENT DOCUMENTS 1,969,704 A 8/1934 D'Alton
3,878,748 A 4/1975 Spence
(Continued)

FOREIGN PATENT DOCUMENTS

EP 2269808 1/2011
EP 2269808 A1 1/2011
(Continued)

*Primary Examiner* — Jeremy Luks
(74) *Attorney, Agent, or Firm* — Tarolli, Sundheim, Covell & Tummino LLP (57) ABSTRACT An acoustic attenuation device extends from a first end to a second end and includes first and second sheets. A plurality of webs positioned between the first and second sheets cooperates with the first and second sheets to form a series of sound attenuation chambers containing a volume and mass of fluid. A first panel secured to the sheets closes the chambers at the first end of the device. A second panel secured to the sheets closes the chambers at the second end of the device. The device further includes first and second openings associated with each chamber and through which excited fluid resonates. The first and second openings extend through the first sheet into each chamber. The first openings have an invariable cross-section. At least one of the second openings has an adjustable cross-section for varying a resonant frequency of the chamber.

14 Claims, 8 Drawing Sheets

(56) References Cited

U.S. PATENT DOCUMENTS

| | | | | |
|---|---|---|---|---|
| 4,787,473 A * | | 11/1988 | Fuchs | F16L 55/033 181/224 |
| 5,930,371 A | | 7/1999 | Cheng et al. | |
| 5,959,265 A | | 9/1999 | Van Ligten | |
| 6,009,705 A | | 1/2000 | Arnott et al. | |
| 6,069,840 A | | 5/2000 | Griffin et al. | |
| 6,085,865 A | | 7/2000 | Delverdier et al. | |
| 6,231,710 B1 | | 5/2001 | Herup et al. | |
| 6,234,758 B1 | | 5/2001 | Pawelski | |
| 6,568,135 B1 | | 5/2003 | Yokoyama et al. | |
| 7,345,594 B2 | | 3/2008 | Huang et al. | |
| 7,360,499 B1 | | 4/2008 | O'Neill | |
| 7,434,409 B2 | | 10/2008 | Gedeon | |
| 7,510,052 B2 | | 3/2009 | Ayle | |
| 7,902,944 B2 | | 3/2011 | Fukunaga | |
| 8,028,802 B2 | | 10/2011 | Durchotlz et al. | |
| 8,047,329 B1 | | 11/2011 | Douglas et al. | |
| 8,157,052 B2 * | | 4/2012 | Fujimori | G10K 11/172 181/293 |
| 8,177,024 B2 | | 5/2012 | Caliskan | |
| 8,506,836 B2 | | 8/2013 | Szuromi et al. | |
| 8,521,320 B2 | | 8/2013 | Silverbrook | |
| 8,607,925 B2 | | 12/2013 | Gideonse | |
| 8,631,901 B2 | | 1/2014 | Honji et al. | |
| 9,214,148 B2 * | | 12/2015 | Kato | G10K 11/172 |
| 2005/0258000 A1 | | 11/2005 | Yano et al. | |
| 2005/0284690 A1 | | 12/2005 | Proscia et al. | |
| 2006/0059801 A1 * | | 3/2006 | Allaei | G10K 11/172 52/204.5 |
| 2009/0283356 A1 * | | 11/2009 | Tsugihashi | F04B 39/0027 181/207 |
| 2010/0065369 A1 * | | 3/2010 | Honji | G10K 11/172 181/293 |
| 2011/0278091 A1 | | 11/2011 | Honji et al. | |
| 2013/0224423 A1 | | 8/2013 | Mikulak et al. | |
| 2015/0060194 A1 * | | 3/2015 | Pongratz | G10K 11/172 181/286 |
| 2015/0122577 A1 | | 5/2015 | Zalewski et al. | |

FOREIGN PATENT DOCUMENTS

| | | |
|---|---|---|
| WO | 2004011304 | 12/2004 |
| WO | 2004011304 A2 | 12/2004 |
| WO | 2006118443 | 11/2006 |
| WO | 2006118443 A1 | 11/2006 |
| WO | 2013043908 | 3/2013 |
| WO | 2013043908 A1 | 3/2013 |

* cited by examiner

TUNABLE ACOUSTIC ATTENUATION

RELATED APPLICATIONS

This application claims the benefit of U.S. Provisional Application Ser. No. 62/161,470, filed May 14, 2015, and entitled TUNABLE ACOUSTIC ATTENUATOR, the entirety of which is incorporated by reference herein.

TECHNICAL FIELD

This disclosure relates generally to acoustic attenuation and, more specifically, relates to a tunable acoustic attenuator and related method.

BACKGROUND

Current mitigation technologies of low frequency spectrum attenuation include acoustic hangers, Helmholtz resonators, chamber core resonators, coverage tube resonators, large volume resonators, and large mass systems. In tube resonators, the frequency is dictated by the length of the chamber(s) therein, which can be limited where size constraints exist. Consequently, an individual tube resonator is not broad band, i.e., the device operates in a narrow frequency range. However, multiple resonators can be tuned to different frequencies by adjusting their lengths such that an assembly of resonators can provide broad band attenuation.

SUMMARY

This disclosure relates generally to acoustic attenuation.

As one example, an acoustic attenuation device extends from a first end to a second end and includes first and second sheets. A plurality of webs positioned between the first and second sheets cooperates with the first and second sheets to form a series of sound attenuation chambers containing a volume and mass of fluid. A first panel secured to the sheets closes the chambers at the first end of the device. A second panel secured to the sheets closes the chambers at the second end of the device. The device further includes first and second openings associated with each chamber and through which excited fluid resonates. The first and second openings extend through the first sheet into each chamber. The first openings have an invariable cross-section and at least one of the second openings has an adjustable cross-section for varying a resonant frequency of the chamber.

As another example, a method of manufacturing an acoustic attenuation device includes three-dimensionally printing a pair of sheets and webs that cooperate with the sheets to define broadband sound attenuation chambers containing a volume and mass of fluid. First and second openings are associated with each chamber and through which excited fluid resonates. The first and second openings extend through the first sheet into each chamber. The first openings have an invariable cross-section and at least one of the second openings has an adjustable cross-section for varying a resonant frequency of the chamber.

As another example, an acoustic attenuation device extends from a first end to a second end and includes first and second sheets a plurality of webs positioned between the first and second sheets and cooperating with the first and second sheets to form a series of sound attenuation chambers containing a volume and mass of fluid. A first panel is secured to the sheets and closes the chambers at the first end of the device. A second panel is secured to the sheets and closes the chambers at the second end of the device. At least one partition divides at least one of the chambers into chamber sections. Each partition includes an outer wall and an inner wall spaced from the inner wall by an annular space. First and second openings are associated with each chamber and through which excited fluid resonates. The first and second openings extend through the first sheet into each chamber. The first openings have an invariable cross-section and at least one of the second openings has an adjustable cross-section for varying a resonant frequency of the chamber.

DETAILED DESCRIPTION

This disclosure relates generally to acoustic attenuation and, more specifically, relates to a variable frequency chamber attenuator device. The device can be used to attenuate a predetermined range of frequencies, such as in the range from about 20 Hz to about 200 Hz, e.g., where either large volume resonators or large mass systems are traditionally used.

The device mitigates acoustic noise by utilizing acoustic chambers, each with one or more openings, which act as resonators and allow molecules of a fluid therein to vibrate through the openings. While the examples disclosed herein describe the fluid as air, it is understood that any fluid or combination of fluids can reside within the chambers, which can depend on the environment where the attenuator device is used. Thus, the fluid can be any substance that flows, which can include liquids (e.g., water, oil, gasoline) and/or gases (e.g., air or its constituents). The initially stationary air inside of a chamber is excited by a pressure wave and moves outside of the chamber through an opening. As the air exits, it creates a pressure difference between the inside and outside of the chamber, thereby forcing the air to move back inside the chamber through the same opening. The air continues to vibrate through the opening at the chamber's resonant frequency, analogue to a tuned mass damper, which dissipates acoustic energy.

Figure 1:
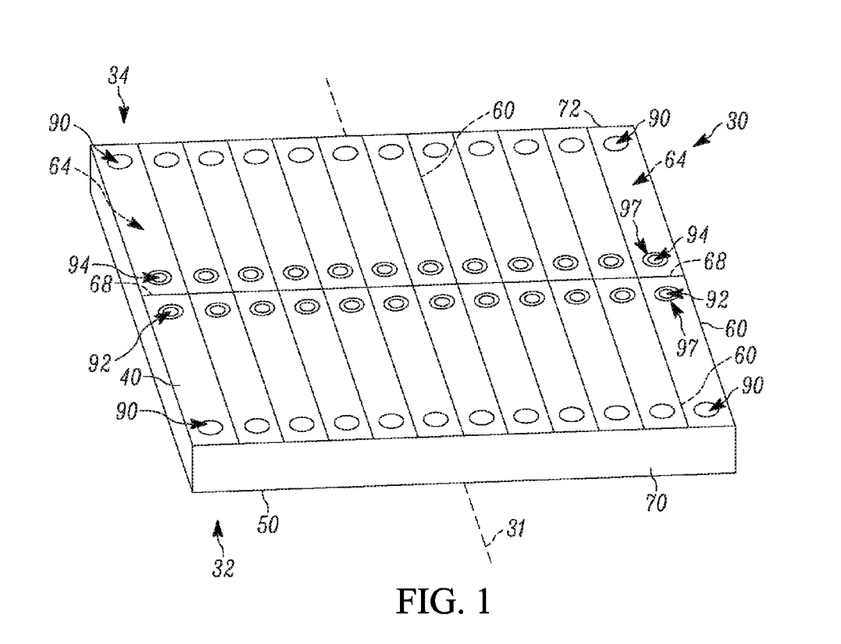
FIG. 1 illustrates an example of a chamber attenuator device.
Figure 2:
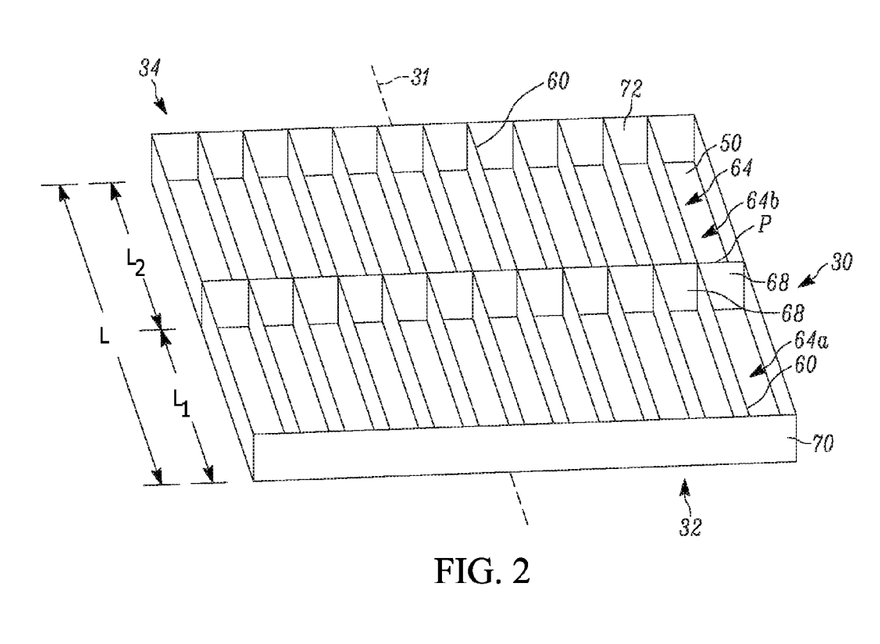
FIG. 2 illustrates a sectional view of the attenuator device of FIG. 1.

FIGS. 1-2 illustrate an example of an acoustic attenuation device or resonator 30. The device 30 extends generally along a centerline or axis 31 from a first end 32 to a second end 34. The device 30 includes a first panel or sheet 40 and a second panel or sheet 50 that are each substantially planar. The first and second sheets 40, 50 can have substantially the same length as one another. The first and second sheets 40, 50 can be parallel to one another or can extend at angles relative to one another (not shown). Although the sheets 40, 50 are illustrated in FIG. 1 as being planar and extending parallel to one another, in other examples, either or both sheets can be curved or contoured in one or more directions (not shown).

As used herein, the term "substantially" is intended to indicate that while the property or condition modified by the term can be a desirable property or condition, some variation can occur. In this context, for example, the term "substantially planar" demonstrates that the panel or sheet can be a flat sheet, although it can exhibit some minor curves, protrusions or other variations apart from being completely flat.

The first and second sheets 40, 50 are spaced apart from one another by a plurality of webs 60 (FIG. 2) extending along or substantially parallel to the axis 31. The webs 60 can also extend at an angle(s) relative to one another and/or be curved in one or more directions (not shown). The webs 60 cooperate within the first and second sheets 40, 50 to define a plurality of sound attenuation chambers 64 within the device 30 extending along and parallel to the axis 31.

In one example, each chamber 64 has a substantially rectangular cross-section, although alternative cross-sectional shapes are contemplated. It will also be appreciated that any chamber 64 can have a constant cross-section or a cross-section that varies along the length of the chamber. In any case, the chambers 64 define a predetermined volume and mass of fluid that resonates upon excitation. An end panel or panels 70 closes the chambers 64 at the first end 32 of the device 30. An end panel or panels 72 closes the chambers 64 at the second end 34 of the device 30. The end panels 70, 72 extend parallel to one another such that the chambers 64 can each have the same length L. In another example (not shown), the device 30 is configured to have a non-rectangular shape, e.g., triangular or trapezoidal, such that the chambers 64 have different lengths.

One or more partitions 68 can be provided within each chamber 64, with each partition having the same perimeter P as the cross-section of the chamber in which it is provided. In this way, the perimeter of P each partition 68 is air-tight, e.g., hermetically sealed, with the sheets 40, 50 and support webs 60. Additionally or alternatively, the end panels 70, 72 and sheets 40, 50 can be hermetically sealed to one another.

Due to this construction, the partitions 68 divide each chamber 64 into two sections 64a, 64b. The first section 64a has a length, indicated at $L_1$, extending parallel to the axis 31 from the end panel 70 to the partition 68. The second section 64b has a length, indicated at $L_2$, extending parallel to the axis 31 from the partition 68 to the end panel 72. The thickness of each web 60 and each sheet 40, 50 can be adjusted such that each chamber 64 and each chamber section 64a, 64b has a predetermined cross-section, which may be constant or vary along each chamber section length $L_1$ and/or each chamber section length $L_2$. In other words, any portion of each web 60 and/or each sheet 40, 50 can have a variable thickness relative to any other portion of that web and/or sheet.

It is also possible that an individual resonator 30 can be comprised of an entire single chamber 64 or multiple chambers, i.e., discrete chamber(s) or interconnected chambers extending back and forth between the first and second ends 32, 34. If multiple, interconnected chambers 64 are used to form a single resonator 30 an opening 63 between the chambers is constructed in the webs 60 to form a layout similar to that shown in FIG. 11. It will therefore be appreciated that the partition 68 can be omitted from one or more chambers 64 such that the chamber constitutes a single, uninterrupted volume between the ends 32, 34 having a length substantially equal to the sum of the lengths of each individual chambers.

Each section 64a and 64b can be tuned to an independent frequency by varying the respective length $L_1$, $L_2$ of each respective acoustic chamber section. In other words, the length of the chamber section 64a, 64b determines the volume and mass of air therein, which determines the acoustic, resonant frequency of that chamber section. Consequently, placing the partition 68 in each chamber 64 at a specific, predetermined position dictates the lengths $L_1$, $L_2$ of the sections 64a, 64b independently tunes each chamber section to a desired frequency. This allows the efficiency of the device 30 to be readily improved without increasing manufacturing time or cost.

In the example shown, each partition 68 can be located at the same longitudinal position along the axis 31 as other partitions such that the first sections 64a all have the same length $L_1$ and the second sections 64b all have the same length $L_2$. Alternatively, one or more partitions 68 can be located at a different longitudinal position relative to other partitions such that the lengths $L_1$, $L_2$ vary between chambers 64 (not shown). The partition 68 in each chamber 64 can therefore be located anywhere along the length L of that chamber.

Figure 3:
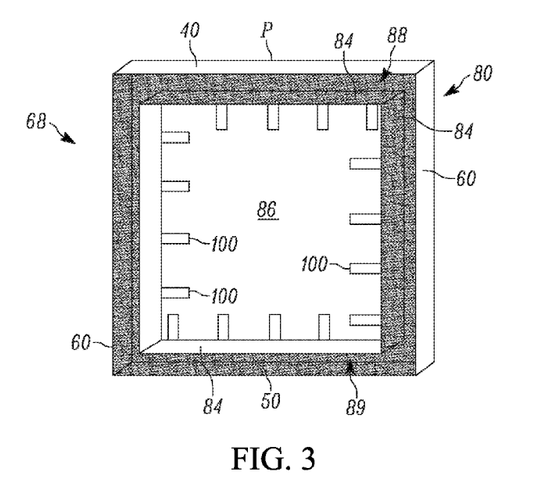
FIG. 3 illustrates a front view of a partition of the attenuator device of FIG. 1.

FIG. 3 illustrates a detailed view of an alternative cross-section of one of the chambers 64 from the example attenuator of FIG. 2. The chamber 64 cross-section, in this instance defined by the partition 68, can include an outer wall 80, an inner wall 84, and a central panel 86. The outer wall 80 is defined by the first and second sheets 40, 50 and a pair of consecutive/adjacent webs 60 (see FIGS. 1-2). Alternatively, the outer wall 80 can be a separately formed component placed between the sheets 40, 50 and adjacent webs 60 and hermetically sealed therewith (not shown).

The inner wall 84 is spaced from the outer wall 80 and, in one example, is concentric with the outer wall. The outer wall 80 and the inner wall 84 are separated by a space 88, which is filled with a damping material 89, such as a granular or powder material. The damping material 89 provides additional mass damping in the same manner as inertial shock dampers. The space 88 can be rectangular (as shown), circular or have a different polygonal shape (not shown). The material 89 can be provided between the walls 80, 84 by polymer binder jetting or any other technique that traps the material between the walls. Alternatively, the annular space 88 can be empty (not shown).

The central panel 86 is enclosed around its perimeter by the inner wall 84. One or more damping fibers 100 can extend through and/or along the central panel 86. The damping fibers 100 provide additional energy dissipation means by further resisting to the passage of air molecules through the partition 68. In one example, the damping fibers 100 extend radially inwardly towards the interior of the central panel 86. The damping fibers 100 can be integrally formed within the central panel 86 or can be separately formed and provided on or in the central panel after the remainder of the panel is formed. The damping fibers 100 can be directly connected to the inner wall 84 or spaced entirely therefrom (not shown).

Referring to FIG. 1, a series of first openings 90 extends through the first sheet 40 at each end 32, 34 of the device 30 for providing a fluid communication pathway between the chambers sections 64a, 64b and ambient or the environment outside the device 30. For example, a first set of the openings 90 are located near an edge corresponding to panel 70 and another set of openings are near the opposing edge corresponding to the panel 72. Each first opening 90 can have any shape, e.g., round, square or polygonal, and be sized the same as or different from any other first opening. As shown in the example of FIG. 1, each first opening 90 is round and has the same diameter $d_1$ as every other first opening. The size and shape of the first openings 90 is fixed or invariable once the device 30 is fully assembled.

Each chamber 64 further includes a pair of second openings 92 or 94. For example, the second openings 92 and 94 are located adjacent to each other along a central portion of the device on opposing sides of the partition 68. One second opening 92 is associated with one chamber section 64a and the other second opening 94 is associated with the other chamber section 64b. In other words, each chamber section 64a has an associated first opening 90 and second opening 92. Each chamber section 64b has an associated first opening 90 and second opening 94.

As a further example, the end panels 70, 72 and sheets 40, 50 are hermetically sealed to one another such that the first and second openings 90, 92, 94 are the only way by which fluid, e.g., air, can enter or exit the device 30. When the partitions 68 are omitted from a particular chamber 64, only one of the second openings 92 or 94 is present at the end of the chamber opposite the first opening 90, such that a single first opening 90 and a single opening 92 are associated with chambers 64 free of partitions 68.

Each second opening 92, 94 can be round, square or have any other shape. The second openings 92, 94 can be the same as one another for each chamber 64 (as shown) or can be different from one another in the same chamber or across different chambers. Each associated pair of second openings 92, 94 can have the same or different spacing from one another as each other associated pair of second openings. Each second opening 92, 94 can therefore be located anywhere along the length $L_1$ or $L_2$ of each associated chamber section 64a, 64b.

In some examples, each opening second 92, 94 is located closer to an end of each respective chamber section 64a, 64b opposite the corresponding first opening 90 to maximize the length over which the excited air can attenuate within the respective chamber section. In one example, the chambers 64 are configured to have a frequency spacing of about 3 Hz relative to one another to help limit the effects of anti-peak on the sound attenuation. In this configuration, each second opening 92 is different from other second openings 92, and each second opening 94 is different from other second openings 94. Each individual second opening 92, 94, jointly with first opening 90, results in different resonant frequency of each individual chamber section 64a, 64b. In one example, each individual second opening 92, 94 has a permanent, prescribed opening such that the resonant frequency of each chamber section 64a, 64b is fixed.

Figure 4A:
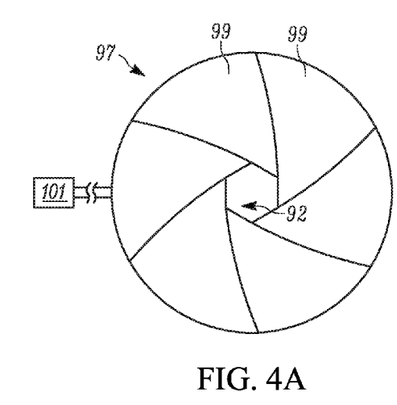
FIG. 4A illustrates a top view of an example adjustable opening in the attenuator device of FIG. 1 in a first condition.
Figure 4B:
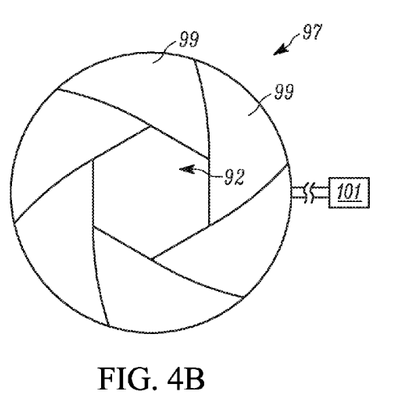
FIG. 4B illustrates a top view of the example adjustable opening in the attenuator device of FIG. 1 in a second condition.

The second openings 92, 94 differ from the first openings 90 in that the cross-section of the second openings is passively or actively adjustable. Referring to FIGS. 4A-4B, a frequency tuning mechanism 97 is associated with each second opening 92 for adjusting the amount of air that can flow through the second opening. As one example, the mechanism 97 includes a series of retractable and extendable leaves 99 that operate in a manner similar to a camera shutter in order to adjust the cross-section of the second opening 92. The spacing of a radially inner edge of the leaves 99 from the center of the associated second opening 92 or 94 is variable to change the size and shape of each second opening. The leaves 99 therefore also move relative to one another to change the spacing therebetween. The leaves 99 can have any desired size and shape to define the second openings 92, 94, e.g., generally triangular or fin-shaped as shown. The mechanism 97 alternatively can include sliding or pivoting doors that cover varying degrees of the openings 92, 94 (not shown).

The mechanism 97 can be associated with each second opening 92 in any number of ways, e.g., connected to the top and/or bottom of the first sheet 40 adjacent each second opening or provided in a recess in the first sheet surrounding each second opening. The mechanism 97 can be integrally formed with the first sheet 40 or a separate component secured thereto.

A controller 101 or other means is electrically connected to the mechanism 97 to facilitate operation of all mechanism. It will be appreciated that the same type controller 101 and mechanism 97 is used to adjust the cross-section of each second opening 94. In other words, each second opening 94 can include an associated mechanism 97, which collectively can be controlled by the same controller 101. FIG. 4A shows a first condition of one mechanism 97, in which the leaves 99 are extended radially towards one another and towards the center of the second opening 92 to reduce the cross-section of the second opening. As a result, the frequency of the chamber 64 is decreased. FIG. 4B shows a second condition of the mechanism 97, in which the leaves 99 are retracted radially away from the center of the second opening 92 to increase the cross-section of the second opening. As a result, the frequency of the chamber 64 is increased. Since the second openings 92, 94 can have any shape, it will be understood that the leaves 99 of the associated mechanism 97 are configured to form the desired shape and size for each second opening.

The mechanism 97 enables active or dynamic frequency tuning for the device 30. In an active resonator, the size of the first openings 90 is fixed and the sizes of the second openings 92, 94 dynamically varies, depending on the desired frequency for the particular chamber section 64a, 64b or chamber 64. For example, the controller 101 responds to user input or signal from one or more sensors (not shown) in the device 30 and actuates the leaves 99 to actively vary the size of one or more second openings 92, 94. In this way, the controller can adjust each opening to the same or different sizes depending on the frequency content of the acoustic source being attenuated. The mechanism 97 can control the leaves 99 either passively or actively to adjust the cross-sections of the second openings 92, 94. Consequently, the size of any second opening 92, 94 can be independently varied to specifically tailor resonant frequencies of the device 30.

Figure 5:
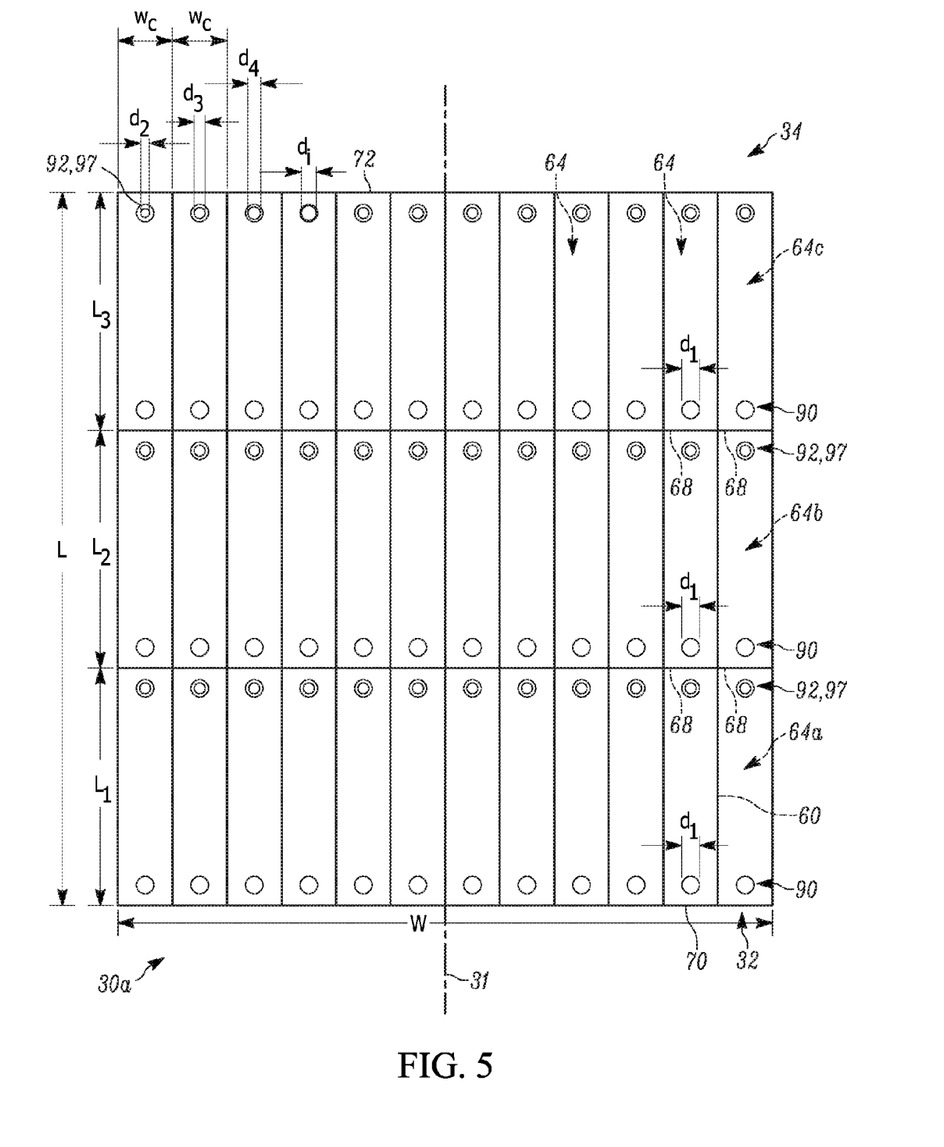
FIG. 5 illustrates a top view of another example of a chamber attenuator device.

In some examples, each of the second openings 92, 94 are individually tuned to the same or different cross-sections to provide desired attenuation for one or more frequency ranges. In FIG. 5 for instance, the mechanisms 97 define second openings 92 having different cross-sections $d_2, d_3, d_4$ from one another. In other examples, the cross-sections $d_2, d_3, d_4$ of the second openings 92, 94 may be adjusted together and to the same cross-section. Once the size(s) of the second openings 92, 94 have been set, they may be fixed to such size (e.g., by applying an adhesive, a locking mechanism or the like to the leaves 99). In other examples, the leaves 99 may remain movable relative to one another and thereby adjustable to enable future tunability of the second openings 92, 94.

In operation, the device 30 mitigates acoustic noise by utilizing the acoustic chambers 64 and associated openings 90, 92, 94, which act as resonators and allow excited air molecules to vibrate therethrough. The initially stationary air inside of each chamber section 64a, 64b is excited by a pressure wave and moves outside of the chamber section through the associated opening pairs 90, 92 or 90, 94. As the air exits, it creates a pressure difference between the inside and outside of the chamber section 64a, 64b, thereby forcing the air to move back inside the chamber section through the respective opening(s) 90, 92, 94. The air continues to vibrate through the openings 90, 92, 94 based upon the chamber's resonant frequency—similar to a tuned mass damper—which dissipates the acoustic energy of the excited air. The chamber sections 64a, 64b are hermetically sealed from one another and, thus, vibrating air within one chamber section does not pass to another chamber section. Rather, the air can only enter or exit each chamber section 64a, 64b through the respective opening pairs 90, 92 or 90, 94. The powder material 89 and/or damping fibers 100, where present, provide additional energy dissipation means for the excited air.

Figure 6:
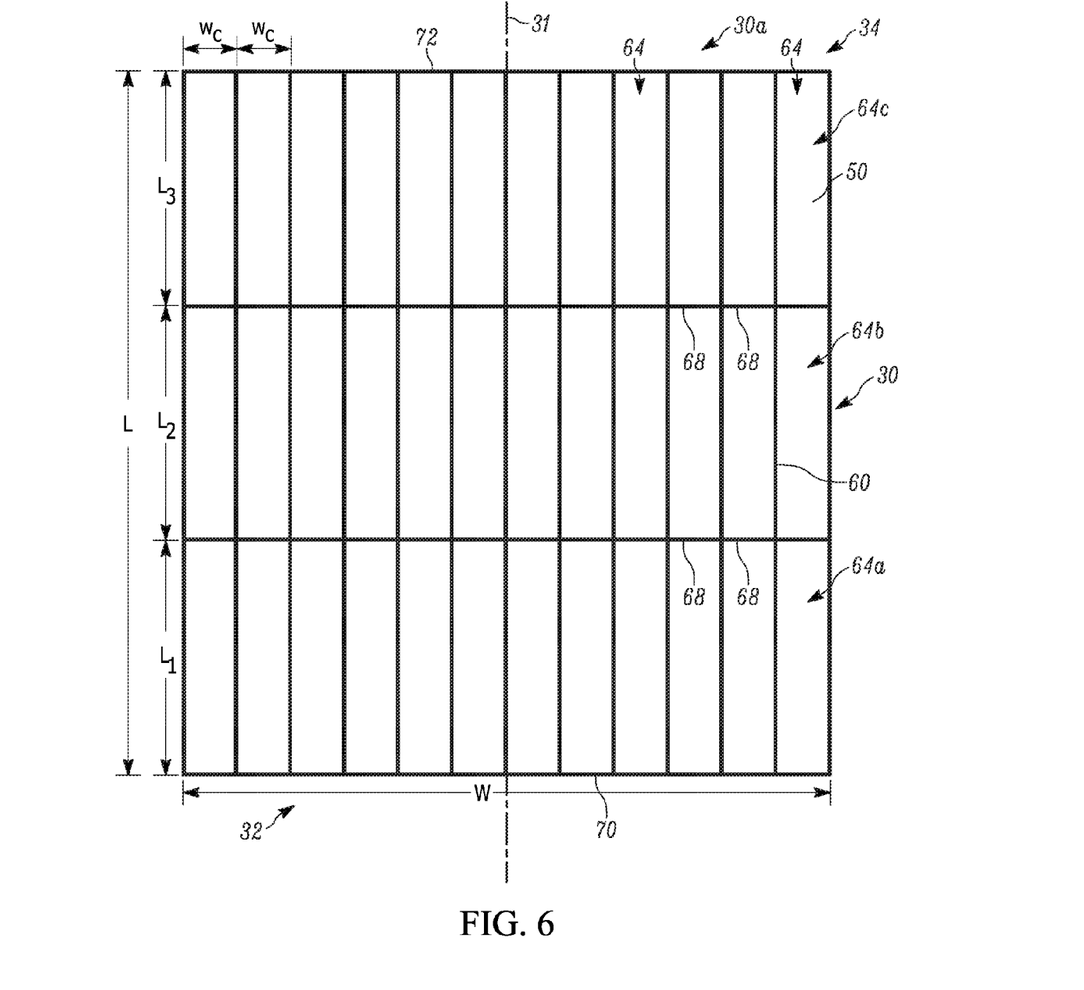
FIG. 6 illustrates a sectional view of the attenuator device of FIG. 5.

In another example shown in FIGS. 5-6, the device 30a is configured such that each chamber 64 includes two partitions 68 along its length L, thereby forming three hermetically sealed chamber sections 64a, 64b, 64c. The first openings 90 extend through the first sheet 40 at one end of each chamber section 64a, 64b, 64c. The second openings 92 extend through the first sheet 40 at the opposite end of each chamber section 64a, 64b, 64c. The partitions 68 can be positioned anywhere along the length of each chamber 64 to specifically tailor the lengths $L_1$, $L_2$, $L_3$ of each chamber section 64a, 64b, 64c. As shown, all the chamber sections 64a have the same length $L_1$, all chamber sections 64b have the same length $L_2$, and all chamber sections 64c have the same length $L_3$. Any one of the lengths $L_1$, $L_2$, $L_3$ in each chamber 64, however, can vary. Regardless of the placement of the partitions 68, in some examples, the chambers 64 all have the same length L. That is, the collective lengths $L_1$, $L_2$, $L_3$ of the chamber sections 64a, 64b, 64c (i.e., between 70 and 72) remain the same in a direction orthogonal to axis 31.

The width W of the device 30a is equal to the collective widths $w_c$ of each chamber 64. As shown, all chambers 64 have the same width $w_c$. In other examples, one or more chambers 64 could, however, have different widths $w_c$ for varying the volume of the chamber to further tune the resonant frequency of that chamber 64. The chamber sections 64a, 64b, 64c in the device 30a of FIGS. 5-6 operate in the same manner as the chamber sections 64a, 64b in the device 30 of FIGS. 1-4.

The acoustic attenuation devices 30, 30a disclosed herein, can be formed using 3D printing—also known as additive manufacturing. Unlike the structural/acoustic coupled chamber core resonators, additive manufacturing allows the devices 30, 30a to be readily customized to meet the attenuation and frequency requirements of the particular application and environment without changing the structural design of the device. Using additive manufacturing to produce the devices 30, 30a therefore provides more design flexibility, a wider usage, and more optimized control in obtaining desired acoustic attenuation requirements. The use of additive manufacturing to produce the devices 30, 30a can accommodate low frequency attenuation without requiring the long chambers of current attenuation designs.

Materials that can be used in additive manufacturing to form the components of the devices 30, 30a include, but are not limited to, aluminum, brass, copper, tin, lead, magnesium, zinc, titanium, steel, stainless steel, and alloys thereof, ceramics, polymers such as thermoplastics, e.g., polyvinylchloride, and paper. The particular material(s) chosen for each component of the devices 30, 30a is based upon desired product requirements and performance criteria.

Additive manufacturing processes that can be used to form the devices 30, 30a include, but are not limited to, extrusion, extrusion deposition, granular material binding, lamination, photopolymerization, and binder jetting. The complete devices 30, 30a illustrated can be formed entirely by additive manufacturing or by hermitically adhering the end panels 70, 72 to the first and second sheets 40, 50 after the rest of the device has been 3D printed.

The devices 30, 30a provide a way to adjust the resonant frequency of the chambers 64 without adjusting the chamber length L. The cross-section of each second opening 92, 94 can be individually adjusted to provide resonant tuning for the particular chamber section 64a, 64b, 64c that meets desired/required frequency for that particular application. The resonator frequency can be adjusted between the frequency corresponding to the length of the open tube resonator and the frequency corresponding to twice the length of the open tube resonator, or the length of the open-closed tube resonator. Therefore, for a tube resonator whose open-closed frequency is 100 Hz and whose open frequency is 200 Hz, the tuning can be performed for any frequency between about 100 Hz and 200 Hz. Due to this construction, broadband, low frequency attenuators can be manufactured that are less complex and less costly than traditional attenuators having resonators of different lengths. Furthermore, unlike the variable length attenuators described, the device 30 can be adjusted or fine-tuned after being manufactured while maintaining a constant length L for all the chambers 64.

The devices 30, 30a greatly simplify the manufacturing process of tube resonator panels. Traditionally, each individual resonator had to be made of a specific length, depending on its frequency. This is challenging for a large number of resonators, both from a logistical and technical standpoint. A resonator panel needs to accommodate two or more resonators per length and multiple resonators per width. Each resonator can, and usually does, have a unique length. Manufacturing such resonators in panels requires applying a series of stops along the length of the panel to separate it from appropriate resonators. Implementing all the resonators dividers at precise locations is time consuming and challenging. Moreover, the frequency of the resonator cannot be changed once the panel is built, eliminating a chance for any necessary corrections should the chamber's length not match the desired resonator frequency.

This device circumvents all the above problems. Using the frequency tuning process described herein, all resonator chambers 64 can have the same length L, which decreases tooling cost and the logistics of resonator layout design and manufacturing. The frequency tuning mechanism 97 also allows for tuning of the device after it has been manufactured and any/all the resonator partitions 68 set into place. This is accomplished by adjusting the size of the second openings 92 and/or second openings 94 associated with the chambers 64 or chamber sections 64a, 64b, 64c. The in-situ adjustment capability of the devices allows for active tuning that was not possible in previous devices and which significantly improves attenuation and increases the frequency range of the devices 30, 30*a*.

Figure 7:
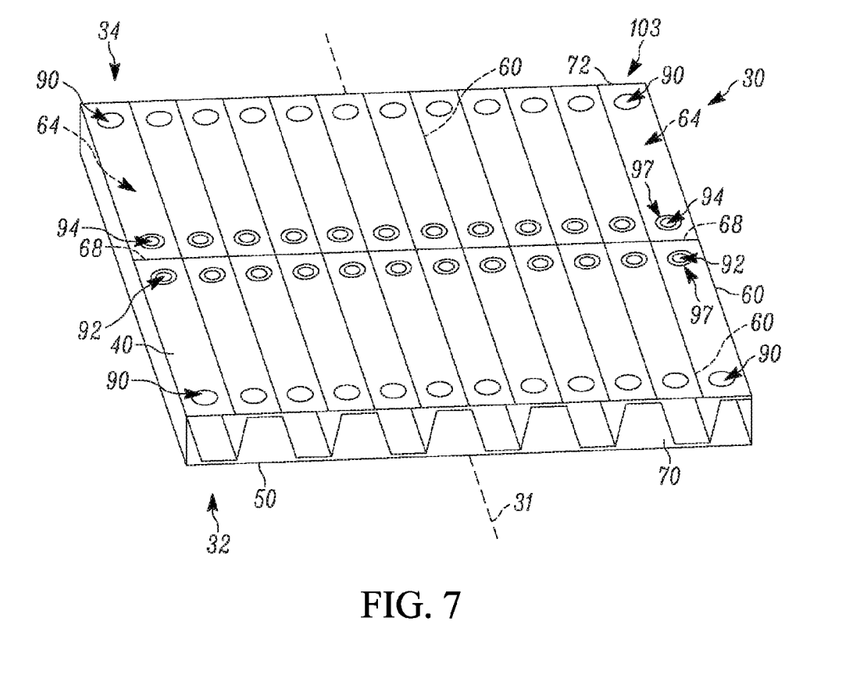
FIG. 7 illustrates an example of a structural panel including the attenuator device of FIG. 1.

The devices 30, 30*a* described herein can be used in broadband acoustic tube resonator panels, either stand alone or imbedded in structural panels 103 (see FIG. 7). These panels 103 can be used on space launch vehicles to provide attenuation for payloads, engine components, or other sensitive equipment. The same broadband attenuation panels 103 can also be used in recording studios, yachts, boats, train cars, as walls/sound dampers in houses and apartment or commercial buildings, and as highway sound barriers. The devices 30, 30*a* can also be used for musical instruments where, instead of changing the acoustic length of a tube or having multiple tubes, the instrument can consist of one tube with two openings: one of them fixed in cross-section and the other having a cross-section that is adjustable via the tuning mechanism 97 to a desired frequency.

Figure 8:
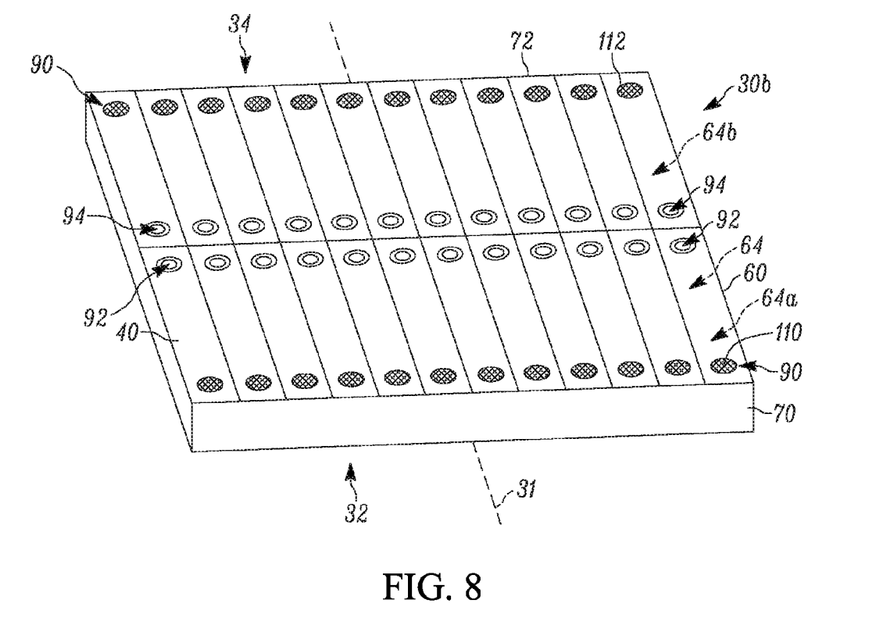
FIG. 8 illustrates the attenuator device of FIG. 1 with mesh over some openings.

FIG. 8 illustrates another device 30*b* in which at least some of the first openings 90 are covered by mesh 110, 112. As shown, the first openings 90 at each end 32, 34 of the device 30*b* are covered by respective mesh 110, 112. Alternatively, any number of the first openings 90 at either or both ends 32, 34 can be covered by mesh 110, 112. The mesh 110, 112 can be a three-dimensional printed component integral with the first sheet 50 or can be added, e.g., via ultrasonic welding, adhesive or other means of affixation, after the remainder of the device 30*b* is manufactured. The mesh 110, 112 provides damping and widens the frequency range over which each chamber 64—or chamber sections 64*a*, 64*b*— attenuates. To this end, the pattern and/or density of the mesh 110, 112 may be tailored to provide the desired degree of damping for each associated first opening 90.

Figure 9:
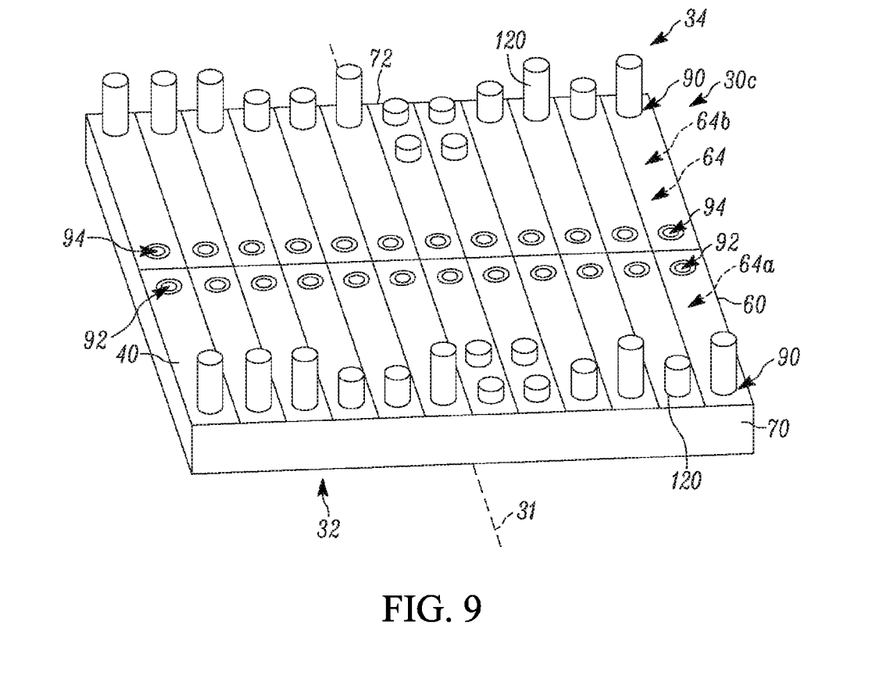
FIG. 9 illustrates the attenuator device of FIG. 1 with necks over some openings.

Referring to FIG. 9, the device 30*c* can alternatively or additionally be provided with tubular necks 120 integrally formed at each first opening 90 on each end 32, 34 of the device 30*c* or added, e.g., via ultrasonic welding, adhesive or other means of affixation, after the remainder of the device 30*c* is manufactured. The necks 120 change the frequency of each respective chamber 64 or chamber section 64*a*, 64*b* and can be used for fine tuning the device 30*c* according to a desired range of frequencies to be attenuated. Thus, each neck 120 can have a particular height extending away from the first sheet 40 to fine tune that specific chamber 64 or chamber section 64*a*, 64*b* accordingly.

Any number of the first openings 90 on the first end 32 of the device 30*c*, including zero (i.e., no openings), can include a neck 120. Likewise, any number of the first openings 90 on the second end 34 of the device 30*c*, including zero (i.e., no openings), can include a neck 120. Each neck 120 can be the same as or different from every other neck. The mesh 110, 112, when present, can be integrally formed with or secured over an opening of the neck 120. It will be appreciated that the mesh 110, 112 and/or necks 120 can be used in any device described herein.

Figure 10:
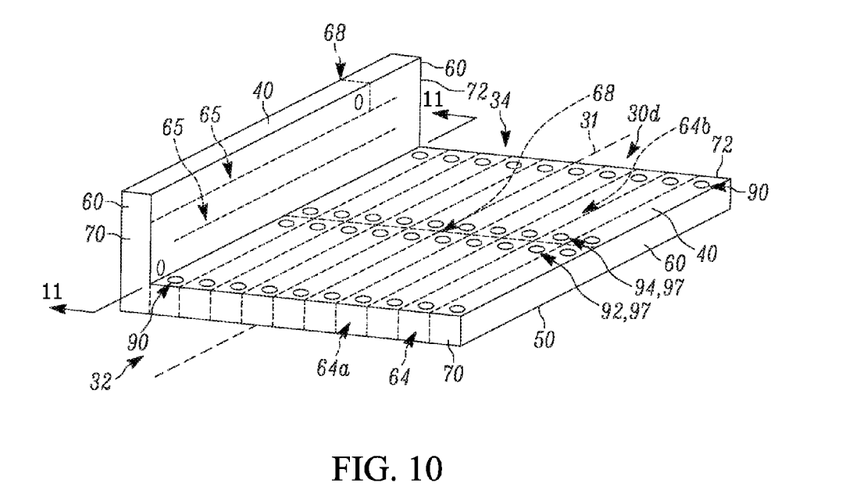
FIG. 10 illustrates a chamber attenuator device with chambers positioned in multiple planes.

Due to the flexibility in customizing each device afforded by additive manufacturing, the sheets 40, 50, webs 60, and end panels 70, 72 can be printed to form chambers that reside in one plane ("in-plane") and multiple planes ("out-of plane"), e.g., horizontal and vertical planes. In one example of this construction illustrated in FIGS. 10-11, the device 30*d* includes multiple chambers 64 arranged in a horizontal plane and multiple chambers 65 arranged in a vertical plane, with the chambers 65 being stacked atop the leftmost (as shown) chamber 64. With this configuration, the effective acoustic length of the collective chambers 64, 65 can be increased, which results in a decreased frequency within the chambers. Increasing the length of the chamber 65 in the vertical direction has little to no negative impact on the overall device 30*d* frequency coverage. Any number of partitions 68, including zero, can be positioned within each chamber 64, 65 to form a desired number of chamber sections within that particular chamber.

Figure 11:
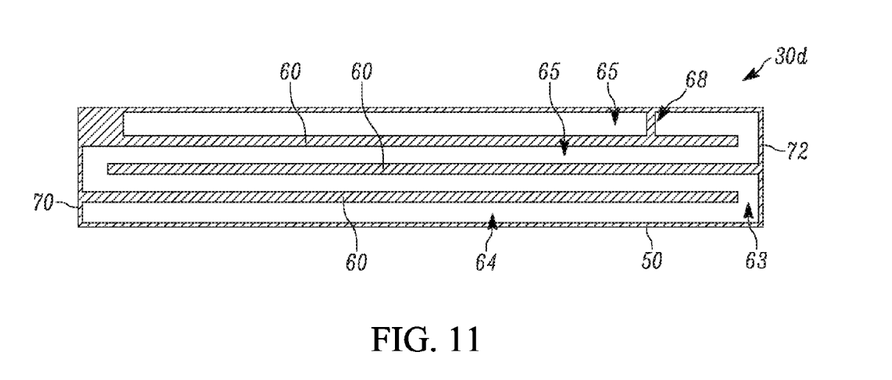
FIG. 11 illustrates a section view of FIG. 10 taken along line 11-11.

As shown in FIG. 11, the vertical plane chambers 65 can form a single, elongated chamber having a substantially longer acoustic length than any of the chambers 64 in the horizontal plane. The device 30*d* can include any number of different length chambers 64, 65 to accommodate a range of desired frequencies, for example. The stacks of vertical chambers 65 extend parallel to the chambers 64. Any additional chambers 65 would be vertically spaced from the openings 90, 92 of the chambers 64 relative to the sheet 40 to ensure air flow therethrough. Increasing the number of chambers 64 and/or chambers 65 increases the frequency range over which the device 30*d* can operate.

An alternate additive manufacturing approach is to fabricate panels by extrusion through a die that has the cross-section of the internal chamber 64. The resulting chambers 64 would have the same cross-section throughout their length. The chambers 64 can be made air-tight, or hermetically sealed, by injecting epoxy or any other fluid sealant that would adhere to the sides of the chamber and then harden to create partitions 68. Fluid sealant can be injected through any opening 90, 92, 94 or 97 onto a temporary partition that is temporarily hermetically sealed by utilizing a pliable sealant, such as RTV, around the chamber 64 cross-section. Once the epoxy hardens, the temporary partitions can be removed, leaving the chambers 64 comprised of an extruded cross-section partitioned along their lengths L using a hardened epoxy. The extruded panel can be composed of various foams, metals, polymers, composites, or any other materials that can be extruded. It will be appreciated that any of the features or constructions shown in the figures can be combined with features in other figures. For example, the multi-plane configuration shown in FIGS. 10 and 11 can include non-linear chambers 64 and/or chambers 65, which can include mesh 110, 112 and/or necks 120 in accordance with the present disclosure.

Figure 12:
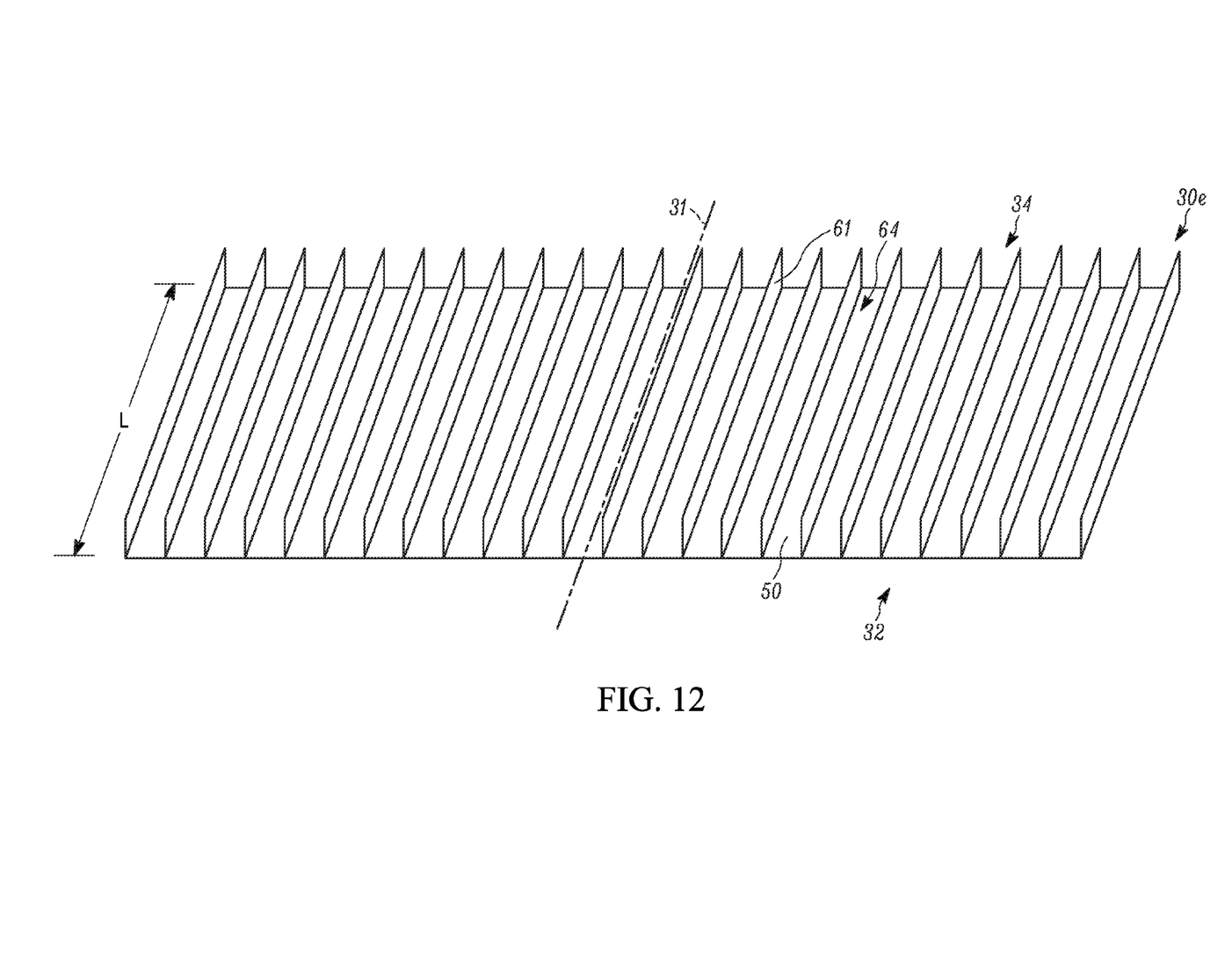
FIG. 12 illustrates another example chamber attenuation device.

An alternative manufacturing approach is to fabricate a device 30*e* having panels formed by wire cutting to produce chambers 64 without the partitions 68, as shown in FIG. 12. The resulting chambers 64 would have the same cross-section throughout their length L. The chambers 64 would be closed along the top by an independently extruded sheet 40 in which the openings 90, 92, 94, 97 would be formed. The chambers 64 can be made air-tight, or hermetically sealed, by providing an epoxy seal (not shown) between the wire cut sheet 50 and webs 60 and independently extruded sheet 40. End panels 70 and 72 (see FIGS. 1-2) can be hermetically adhered to the webs 60 and sheet 50 using epoxy to close the longitudinal ends of the chambers 64.

One or more of the chambers 64 can be divided into multiple chamber sections 64*a*, 64*b*, 64*c*. The chamber sections 64*a*, 64*b*, 64*c* can be made air-tight, or hermetically sealed, by injecting epoxy or any other fluid sealant (not shown) into the chamber 64 that would adhere to the sides of the chamber and then harden to create partitions 68. Fluid sealant can be injected through any opening 90, 92, 94 or 97 onto a temporary partition that is temporarily hermetically sealed by utilizing a pliable sealant around the chamber 64 cross-section. Once the sealant material hardens, the temporary partitions can be removed, leaving the chambers 64 comprised of an extruded cross-section partitioned along their lengths L. The resulting device 30e can be composed of various foams or other materials that can be wire cut.

What have been described above are examples. It is, of course, not possible to describe every conceivable combination of components or method, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An acoustic attenuation device extending from a first end to a second end comprising:
   first and second sheets;
   a plurality of webs positioned between the first and second sheets and cooperating with the first and second sheets to form a series of sound attenuation chambers containing a volume and mass of fluid;
   a first panel secured to the sheets and closing the chambers at the first end of the device;
   a second panel secured to the sheets and closing the chambers at the second end of the device; and
   first and second openings associated with each chamber and through which excited air resonates, the first and second openings extending through the first sheet into each chamber, the first openings having an invariable cross-section and at least one of the second openings having an adjustable cross-section for varying a resonant frequency of the chamber.

2. The acoustic attenuation device of claim 1 further comprising a frequency tuning mechanism associated with each second opening for adjusting the cross-section of each second opening.

3. The acoustic attenuation device of claim 2, wherein the frequency tuning mechanism comprises:
   a plurality of leaves; and
   a controller to change a position the leaves to adjust the cross-section of each second opening.

4. The acoustic attenuation device of claim 3, wherein the leaves cooperate to form a shutter, a spacing from a radially inner edge of the leaves to a center of the second opening being variable by the controller.

5. The acoustic attenuation device of claim 1, wherein the cross-section of the second openings is adjustable after the device is fully assembled.

6. The acoustic attenuation device of claim 1 further comprising at least one partition for dividing at least one of the chambers into chamber sections, each partition including an outer wall and an inner wall spaced from the inner wall by a space.

7. The acoustic attenuation device of claim 6 further comprising a powdered material provided between the inner wall and the outer wall.

8. The acoustic attenuation device of claim 6 wherein each partition includes damping fibers that dissipate energy to provide resistance to a flow of the excited air through the partition.

9. The acoustic attenuation device of claim 6, wherein the at least one partition comprises a plurality of partitions that divides each chamber into a first chamber section and a second chamber section, all first chamber sections having the same length and all second chamber sections having the same length.

10. The acoustic attenuation device of claim 6, wherein the at least one partition comprises a plurality of partitions that divides each chamber into a first chamber section, a second chamber section, and a third chamber section, all the first chamber sections having the same length, all the second chamber sections having the same length, and all the third chamber sections having the same length.

11. The acoustic attenuation device of claim 1, wherein at least two of the second openings are different from one another.

12. The acoustic attenuation device of claim 1 wherein the chambers comprise a plurality of first chambers in a first plane and at least one second chamber in a second plane different from the first plane.

13. An acoustic attenuation device extending from a first end to a second end comprising:
   first and second sheets;
   a plurality of webs positioned between the first and second sheets and cooperating with the first and second sheets to form a series of sound attenuation chambers containing a volume and mass of fluid;
   a first panel secured to the sheets and closing the chambers at the first end of the device;
   a second panel secured to the sheets and closing the chambers at the second end of the device;
   at least one partition for dividing at least one of the chambers into chamber sections, each partition including an outer wall and an inner wall spaced from the inner wall by an annular space;
   first and second openings associated with each chamber and through which excited fluid resonates, the first and second openings extending through the first sheet into each chamber, the first openings having an invariable cross-section and at least one of the second openings having an adjustable cross-section for varying a resonant frequency of the chamber; and
   a frequency tuning mechanism associated with each second opening for adjusting the cross-section of each second opening, the frequency tuning mechanism having a plurality of leaves and a controller for changing the spacing between the leaves to adjust the cross-section of each second opening for varying the resonant frequency of the chamber.

14. The acoustic attenuation device of claim 13, wherein the leaves cooperate to form a shutter, the spacing from the leaves to a center of the second opening being variable by the controller.

* * * * *